(12) United States Patent
Wang et al.

(10) Patent No.: US 12,045,285 B2
(45) Date of Patent: Jul. 23, 2024

(54) SOCIAL GRAPH GENERATION METHOD USING A DEGREE DISTRIBUTION GENERATION MODEL

(71) Applicant: TSINGHUA UNIVERSITY, Beijing (CN)

(72) Inventors: Chaokun Wang, Beijing (CN); Binbin Wang, Beijing (CN); Bingyang Huang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 28 days.

(21) Appl. No.: 17/784,175

(22) PCT Filed: Mar. 20, 2020

(86) PCT No.: PCT/CN2020/080472
§ 371 (c)(1),
(2) Date: Jun. 10, 2022

(87) PCT Pub. No.: WO2021/184367
PCT Pub. Date: Sep. 23, 2021

(65) Prior Publication Data
US 2023/0032521 A1    Feb. 2, 2023

(51) Int. Cl.
*G06F 16/904*    (2019.01)
*G06F 9/44*    (2018.01)
(Continued)

(52) U.S. Cl.
CPC ........ *G06F 16/9024* (2019.01); *G06F 16/211* (2019.01)

(58) Field of Classification Search
CPC ...... G06F 16/9024; G06F 16/211; G06F 9/44; G06Q 50/01
See application file for complete search history.

(56) References Cited

U.S. PATENT DOCUMENTS

| | | | | |
|---|---|---|---|---|
| 8,560,605 B1 * | 10/2013 | Gyongyi | ................. | G06F 16/95 709/204 |
| 8,626,835 B1 * | 1/2014 | Gyongyi | ............... | G06F 16/285 709/204 |

(Continued)

FOREIGN PATENT DOCUMENTS

CN    106097107 B    * 10/2020    ............. G06Q 30/02

OTHER PUBLICATIONS

Rios, Juan Camilo Ramírez de los, Paula Alejandra Escudero Marín, and María Camila Vásquez-Correa. "ABMS of social network based on affinity." arXiv preprint arXiv:1903.05977 (2019). (Year: 2019).*

(Continued)

*Primary Examiner* — Dennis Truong
(74) *Attorney, Agent, or Firm* — IPro, PLLC (57) ABSTRACT

The disclosure proposes a social graph generation method based on the degree distribution generation model, including: setting the social graph generation schema which is the configuration used to generate graphs, setting the degree distribution generation model which is used to generate an out-degree and a number of target vertices for a source vertex so that the out-degree and in-degree distribution follows the desired distribution, generating a general graph based on the degree distribution generation model, generating a social graph based on the degree distribution generation model, and generating graphs in a streaming manner. This disclosure determines the out-degree and a target vertex ID for a source vertex efficiently. The vertices in the generated graphs could represent users in the social networks and the edges could represent the relationships in the social networks. The synthesis graphs have the characteristics of real-world networks and can be used for social networks analysis.

8 Claims, 1 Drawing Sheet

(51) Int. Cl.
   *G06F 16/21* (2019.01)
   *G06F 16/901* (2019.01)
   *G06Q 50/00* (2024.01)

(56) References Cited

U.S. PATENT DOCUMENTS

| | | | | |
|---|---|---|---|---|
| 8,736,612 | B1* | 5/2014 | Goldman | G06F 16/9024 |
| | | | | 345/440 |
| 8,880,600 | B2* | 11/2014 | Lento | G06F 16/958 |
| | | | | 709/204 |
| 2015/0026120 | A1* | 1/2015 | Chrapko | G06F 16/904 |
| | | | | 707/748 |
| 2015/0120717 | A1* | 4/2015 | Kim | G06F 16/335 |
| | | | | 707/727 |
| 2015/0242967 | A1* | 8/2015 | Shsh | G06Q 50/01 |
| | | | | 705/319 |
| 2017/0270210 | A1* | 9/2017 | Padmanabhan | G06F 16/9024 |
| 2018/0103111 | A1* | 4/2018 | Narayanam | H04L 51/04 |

OTHER PUBLICATIONS

G. Vakhitov, Z. Enikeeva, N. Yangirova, A. Shavalieva and P. Ustin, "Identification of the Clusters of Social Network Communities for Users with a Specific Characteristic," 2019 12th International Conference on Developments in eSystems Engineering (DeSE), Kazan, Russia, 2019, pp. 140-146, (Year: 2019).*

H. Jung and S. Kim, "Sigcon: Simplifying a Graph Based on Degree Correlation and Clustering Coefficient," 2017 IEEE 19th International Conference on High Performance Computing and Communications; IEEE 15th International Conference on Smart City; pp. 372-379 (Year: 2017).*

* cited by examiner

SOCIAL GRAPH GENERATION METHOD USING A DEGREE DISTRIBUTION GENERATION MODEL

TECHNICAL FIELD

The disclosure herein relates to computer science, especially to a social graph generation method based on a degree distribution model.

BACKGROUND

Social graph generators aim to generate social networks as realistic as possible. With the rapid progress of social media, a number of social network analysis tasks have emerged, such as community detection, community search, and network representations. Clearly, both real-world and synthetic graphs are necessary to evaluate the performance and scalability of various algorithms for social network analysis tasks. Thus, social graph generators have been becoming more and more important, especially because different algorithms focus on different features of social graphs.

For example, the community detection algorithms using hierarchical clustering or blocking matrices techniques proceed on homogeneous graphs in which there is only one type of nodes and edges. Some community detection algorithms are performed on heterogeneous graphs with multiple aspects of relationships and multiple labels of vertices. In addition, real-world communities can be classified as overlapping and non-overlapping communities, and many social applications encounter the exponential growth in the graph size.

However, existing synthetic graph generators cannot satisfy all of the above demands. Some schema-driven methods have been proposed to generate for various domains and applications. These methods, such as gMark, use well-designed schemas to cover features commonly found in graphs, e.g., the labels of vertices and edges. However, most of these methods are not designed for social graphs, since they lack the support for generating graphs with community structures. Also, they are not suitable to generate large-scale graphs.

LFR is a widely used benchmark tool for generating social graphs. It constructs communities based on the rules that vertices share more links with the other vertices in the same community than those in other communities. The in-degree of vertices of the generated graphs conform to the power-law distribution, but the out-degree does not. In addition, LFR has a limitation on the size of the generated graph due to its high computational overhead when constructing communities.

There are a number of methods proposed to generate large-scale synthetic graphs. RMAT and Kronecker are most widely used among them. RMAT uses a recursive matrix model to recursively select a quadrant of the adjacency matrix until a cell is selected. The procedure repeats until all edges are generated. Kronecker has two graph generation models, i.e., Stochastic Kronecker Graph (SKG) and Deterministic Kronecker Graph (DKG). The widely used SKG is a generalized variant of the recursive matrix model in terms of the number of probability parameters. The space complexity of RMAT is $O(|E|)$, and the time complexity of Kronecker is $O(|V|^2)$. TrillionG proposes a new generation model called the recursive vector model to generate trillion-scale graphs efficiently. However, TrillionG only generates general graphs, i.e., ones without the guarantee of having the community structures.

Therefore, existing technology needs to be improved.

The foregoing background is for purposes of assisting in understanding the present disclosure only and is not intended to admit or recognize that any referenced matter is part of a well-known common sense with respect to the present disclosure.

SUMMARY

To solve the above technical problems, the present disclosure proposes a social graph generation method based on degree distribution generation model.

In an instance of the social graph generation method based on the degree distribution generation model, the generator generates social graphs according to a user-defined schema information.

Degree distribution generation model. The generator generates the out-degree for a source vertex and a number of target vertices using the degree distribution generation model to make sure the out-degree of source vertices and in-degree of target vertices conform to the desired distribution.

Given the number of source vertices and target vertices and the parameters of the degree distributions, the generator generates general graphs.

The generator generates social graphs based on the degree distribution generations model. Determine the size of each community. Determine the number of source vertices and target vertices of each community graph and graph among communities, which are generated using the general graph generation algorithm and be combined into a social graph.

The generator generates graphs in a streaming manner by comparing the numbers of source vertices and target vertices in the current generation stage and those in the last generation stage to determine the new vertices and edges. Then, it generates a simple graph in each generation stage.

In another instance of the social graph generation method based on the degree distribution generation model, the schema for the social graph generation is defined as follows.

The schema includes vertex schema, edge schema, community schema, and social graph generation schema, whose symbols are defined as follows.

The vertex schema VS=(lbl, amount, attr), where amount is the number of vertices labeled lbl, and attr is the attribute information. Attributes of a vertex are represented as a set of key-value pairs.

The edge schema ES=(lbl, $lbl_s$, $lbl_t$, amount, $distr_{in}$, $distr_{out}$, attr), where lbl and $lbl_t$ are respectively the label of source vertices and target vertices, amount is the number of edges labeled lbl, $distr_{in}$ stands for the in-degree distribution of target vertices, and $distr_{out}$ stands for the out-degree distribution of source vertices. Attributes information attr of edges are a set of key-value pairs.

The community schema CS=($lbl_e$, amount, $\lambda_s$, $\lambda_t$, p), where $lbl_e$ is the label of edges in a community, and amount is the number of communities. The community size conforms to a power-law distribution, $\lambda_s$ and $\lambda_t$ are the power-law parameters of the community size in source and target vertices, respectively. The number of edges between different communities depends on the community fusion parameter p which is a real number between 0 and 1.

The social graph generation schema SGS=(VSS, ESS, CSS), where VSS, ESS, and CSS represent a set of vertex schemas, a set of edge schemas, and a set of community schemas, respectively.

The symbols of the generated social graph are as follows: the heterogeneous graph G=(V,E), where V is the vertex set, and E⊆V×V is the edge set.

A vertex v∈ V is represented as a triple (id, lbl, attr), where id, lbl, and attr stand for ID, label, and attributes of the vertex, respectively.

An edge e∈ E is represented as $(v_s, v_t, lbl, attr)$, where $v_s$ is the source vertex ID, $v_t$ is the target vertex ID, lbl is the edge label, and attr is the attributes of the edge. The $v_s$, $v_t$, and lbl unique identify an edge e.

The attribute information of nodes and edges is optional. For example, in the scene of Peking Opera, the content comments posted by users of famous Peking Opera vocals can be represented as nodes, while famous artists belong to a certain genre and famous artists participate in a certain vocals. The attention relationship between users users who are interested in a certain artist can be represented as edges Among them, the model information of famous node includes (famous LBL, quantity, attribute information).

In another instance of the social graph generation method based on the degree distribution generation model, the community fusion parameter p is a real number between 0 and 1. Larger p values mean that there will be more edges among communities.

In another instance of the social graph generation method based on the degree distribution generation model, the social graph generation method generates an out-degree and multiple target vertices for a source vertex randomly and ensure that the in-degree distribution and out-degree distribution conform to desired distributions.

The probability mass function is derived as follows:

$$p(x) = \begin{cases} \alpha P(D = x; \theta) & \text{if } x \in [d_{min}, d_{max}] \text{ and } x \in N^+ \\ 0 & \text{otherwise} \end{cases} ;$$

where $d_{min}$ and $d_{max}$ are the minimum degree and maximum degree, respectively. θ indicates the parameters of the degree distribution. P(D=x;θ) is the existence probability of vertices with degree D=x. The normalization parameter a is used to make the sum of the probabilities of vertices whose degrees are in a certain range be 1.

Given the out-degree distribution $distr_{out}$, the number of source vertices $n_s$ and the expected number of edges $n_e$, the out-degree of a source vertex is calculated as follows.

The number of edges $n_e'$ when the out-degree of source vertices follows the $distr_{out}$ distribution:

$$n_e' = \sum_{k=outd_{min}}^{outd_{max}} x \cdot n_s \cdot \alpha \cdot P(D = x; \theta_{out}),$$

where $outd_{min}$ is the minimum out-degree of source vertices, $outd_{max}$ is the maximum out-degree of source vertices, and $\theta_{out}$ is the parameter of $distr_{out}$.

Adjust the maximum out-degree $outd_{max}$ to make the number of existing edges $n_e'$ match the number of expected edges $n_e$.

The formula of the cumulative distribution function (CDF) is: $F(x) = \sum_{i=outd_{min}}^{x} \alpha P(D=i; \theta_{out})$, where $x \in [outd_{min}, outd_{max}]$.

To generate a random number following a specified distribution whose CDF is F(x), we first generate a uniformly distributed value on [0,1] denoted as y, and then $F^{-1}(y)$ is the generated number.

Design a new function $$G(z) = \text{argmax}_x F(x) \le z, x \in [outd_{min}, outd_{max}],$$

where $z \in \{i \cdot step | i \in N^+, step=minP(D=x), i \cdot step \le \}$.

Given a uniformly distributed random value y on [0,1], we can obtain $F^{-1}(y)$ from $$G\left(\left\lfloor \frac{y}{step} \right\rfloor \cdot step\right)$$

directly.

In another instance of the social graph generation method based on the degree distribution generation model, the method of adjusting the maximum out-degree $outd_{max}$ to make the number of existing edges $n_e'$ match the number of expected edges $n_e$ is as follows.

If $n_e' < n_e$, increase $outd_{max}$ until the number of vertices with out-degree $outd_{max}$ is less than 1, or $n_e' \le n_e$.

If $n_e' = n_e$, there is no need to adjust $outd_{max}$.

If $n_e' > n_e$, reduce $outd_{max}$ to make $n_e' < n_e$.

In another instance of the social graph generation method based on the degree distribution generation model, the generator generates a target vertex for a source vertex with a determined out-degree.

Given the in-degree distribution $distr_{in}$, the number of target vertices $n_t$, and the expected number of edges $n_e$, compute the target vertex ID to make the in-degree distribution conforms to the expected distribution.

Define an additional cumulative distribution function of the sum of in-degree: $F_s(x) = \sum_{i=ind_{min}}^{x} \beta \cdot i \cdot \alpha \cdot P(D=i; \theta_{in})$, where $x \in [ind_{min}, ind_{max}]$ and β is a normalization parameter and its formula is $$\beta = \frac{1}{\sum_{k=ind_{min}}^{ind_{max}} i \cdot \alpha \cdot P(D = i; \theta_{in})}.$$

Define two auxiliary functions between some random values on [0,1] and the CDF values are as follows:

$$H_1(z) = F_s\left(\text{argmax}_x F_s(x) \le z\right), H_2(z) = F_s\left(\text{argmin}_x F_s(x) \ge z\right),$$

where x is the in-degree $$z \in \{i \cdot step \mid i \in N^+\},$$

$$step = \min_{x \in [ind_{min}, ind_{max}]} (F_s(x+1) - F_s(x)), i \cdot step \le 1.$$

To find the corresponding target vertex IDs, another two functions are defined as follows:

$$G_1(z) = \sum_{k=ind_{min}}^{x_1} i \cdot \alpha \cdot P(D = i; \theta_{in}),$$

-continued $$G_2(z) = \sum_{k=ind_{min}}^{x_2} i \cdot \alpha \cdot P(D = i; \theta_{in}), \text{ where,}$$

$$x_1 = \underset{x}{\operatorname{argmax}} F_s(x) \le z, \, x_2 = \underset{x}{\operatorname{argmin}} F_s(x) \ge z.$$

The target vertex ID is calculated by $$G_1(z) + \left\lfloor (y - H_1(z)) \times \frac{G_2(z) - G_1(z)}{H_2(z) - H_1(z)} \right\rfloor.$$

In another instance of the social graph generation method based on the degree distribution generation model, given the number of source vertices, the number of target vertices, and the degree distribution parameters, the generation process of general graphs is as follows.

The parameters for generation include the number of source vertices $n_s$, the number of target vertices $n_t$, the number of expected edges $n_e$, the in-degree distribution of target vertices $distr_{in}$, and the out-degree distribution of source vertices $distr_{out}$.

We can use an $n_s \times n_t$ matrix M to represent the graph. $M_{ij}=1$ means that there exists an edge from a source vertex $v_i$ to a target vertex $v_j$, and $M_{ij}=0$ implies that there is no such edge.

The general graph generation method determines outd target vertices to build edges.

In another instance of social graph generation method based on the degree distribution generation model, determine the number of source vertices and the number of target vertices of each community graph and graphs among community. Then, the generator generates simple graphs and combine them into a social graph.

Given a social graph generation schema S, let $d_{out}(u)$ be the out-degree of vertex u, $d_{out}^i(u)$ the out-degree of u with vertices inside the same community, and $d_{out}^e(u)=d_{out}(u)-d_{out}^i(u)$ the out-degree of u with vertices in other communities. A probability dense function (PDF) for $d_{out}^e(u)$ of vertex u as follows:

$$p(x) = \begin{cases} \alpha e^{-\frac{x}{1+\rho}} & \text{if } x \in [1, outd'_{max}], \\ 0 \end{cases}$$

where $\alpha$ is a normalization parameter, p is the community fusion parameter user-defined in community schemas and is a real number between 0 and 1, and $outd'_{max}=outd_{max}-d_{out}^i(u)$, $outd_{max}$ is the maximum out-degree of source vertices, p(x) is a monotone decreasing function.

Regard the out-degree random variable $d_{out}^e(u)$ as a continuous variable, and then the following equation according to the property of PDF:

$$\int_1^{outd'_{max}} \alpha e^{-\frac{x}{1+\rho}} = 1.$$

For a source vertex u, the out-degree with vertices in other communities $$d_{out}^e(u) = -(1+\rho)\log\left(e^{-\frac{1}{1+\rho}} + y\left(e^{-\frac{outd'_{max}}{1+\rho}} - e^{-\frac{1}{1+\rho}}\right)\right),$$

where y is a real number from a uniform distribution U(0,1) and the following equation holds between y and the target external out-degree $d_{out}^e(u)$:

$$\int_1^{d_{out}^e(u)} \alpha e^{-\frac{x}{1+\rho}} = y.$$

For each edge schema ES and the corresponding source vertex schema $VS_s$, target vertex schema $VS_t$, and the community schema CS, denote the number of generated edges ES·amount as $n_e$, the number of source vertices $VS_s$·amount as $n_s$, the number of target vertices $VS_t$·amount as $n_t$, the number of communities CS·amount as $n_c$, and CS·$\lambda_s$ and CS·$\lambda_t$ are the power-law parameters.

Determine the size of each community according to the number of communities CS·amount and the power-law parameters CS·$\lambda_s$ and CS·$\lambda_t$ so that the community size conforms to a power-law distribution. Denote the size of $n_c$ communities as:

$$n_{s_1} \times n_{t_1}, \ldots, n_{s_{n_c}} \times n_{t_{n_c}}.$$

For a source vertex u, generate an external out-degree $d_{out}^e(u)$ with vertices in other communities randomly, and then $d_{out}^e(u)$ target vertices are generated to build edges from the source vertex u to target vertices in other communities.

In another instance of social graph generation method based on the degree distribution generation model, the generator generates graphs in a streaming manner by comparing the numbers of source vertices and target vertices in the current generation stage and those in the last generation stage to determine the new vertices and edges. Then, it generates a simple graph in each generation stage.

Given the number of source vertices $n_s$, the number of target vertices $n_t$, the number of expected edges $n_e$, the in-degree distribution of target vertices $distr_{in}$, the out-degree of source vertices $distr_{out}$, and the growing rate $r_g$ which is a real number in the interval [0,1], the streaming graphs generation process is as follows.

The last percentage and the target percentage are initialized to be 0 and $r_g$, respectively.

The generation process can be decomposed into a series of sub-process of generating a general graph in a non-streaming manner. In each generation sub-process, the number of source vertices and that of target vertices are $n_s \cdot pc_{tg}$ and $n_t \cdot pc_{tg}$, respectively. For an existing source vertex, the out-degree is the difference between the result in this sub-process and that in the last sub-process. For a new source vertex, determine an out-degree directly. When generating a target vertex, the algorithm should make sure that the ID is equal to or less than $n_t \cdot pc_{tg}$.

The disclosure has the following advantages compared with the existing techniques.

The disclosure proposes a social graph generation method based on the degree distribution generation model. The model can generate a random value following a given distribution in O(1) time. Thus, we can use this model to determine an out-degree and a number of target vertices for a source vertices to generate edges. The generated social graphs have the characteristics of real-world social graphs. The generator uses user-defined configurations to generate graphs, which is widely applicable. The generation method is efficient and scalable, and is proper to generate trillion-scale graphs.

BRIEF DESCRIPTION OF FIGURES

The accompanying drawings, which form a part of the specification, describe embodiments of the present disclosure and together with the description serve to explain the principles of the present disclosure.

The present disclosure will be more clearly understood from the following detailed description, with reference to the accompanying drawings, in which.

DETAILED DESCRIPTION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

With the rapid progress of social media, billions of nodes becoming more and more common in real-world applications. Such complex social networks can be represented as graphs, where users are represented as nodes and interactions among users, such as following, commenting, and liking, are represented as edges. Many social network analysis tasks are emerged to assist in practical applications. For example, the community detection algorithms detect the structure in the network, and the structural information could assist in risk control tasks and user recommendation tasks. In order to verify the effectiveness and scalability of social network analysis algorithms, the synthetic datasets are needed due to the high cost of extracting networks in actual applications. Thus, it is necessary to generate social graphs efficiently.

The disclosure proposes a social graph generation method based on the degree distribution generation model. The method uses a user-defined schema to generate social graphs, which can meet the needs of various application scenarios. The efficient and scalable generation method is suitable for generating large-scale graphs.

A social networking graph generation method based on a degree distribution generation model provided by the present disclosure is described in more detail below in conjunction with the accompanying drawings and embodiments.

The social graph generation method based on the degree distribution generation model constructs a graph by operating on tis matrix representation. For each source vertex, an out-degree is generated and then a number of target vertices are determined to generated edges.

We propose a new generation model called the degree distribution generation model to accelerate the generation process. The time complexity of determining the out-degree and a target vertex for a source vertex are O(1). Therefore, it is suitable to use the degree distribution generation model to generate large-scale graphs. Moreover, the model is a general model, which means that we can use this model to generate graphs with specified degree distribution as long as the probability density function or the probability mass function is given.

Figure 1:
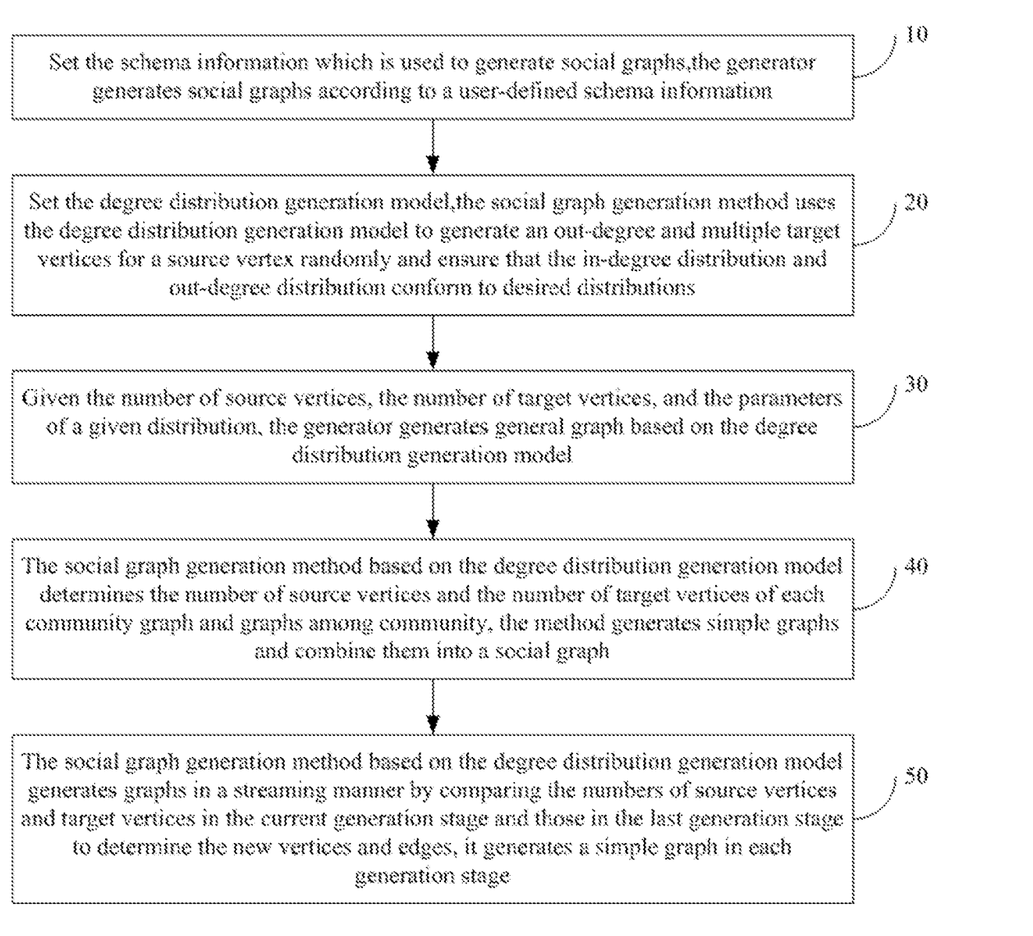
FIG. 1 is a flow diagram of a social networking graph generation method based on a degree distribution generation model provided by the invention.

FIG. 1 is a flowchart of a social networking graph generation method based on a degree distribution generation model provided by the present disclosure, as shown in FIG. 1, the social networking graph generation method based on the degree distribution generation model 10, Set the schema information which is used to generate social graphs, the generator generates social graphs according to a user-defined schema information.

20, Set the degree distribution generation model, the social graph generation method uses the degree distribution generation model to generate an out-degree and multiple target vertices for a source vertex randomly and ensure that the in-degree distribution and out-degree distribution conform to desired distributions.

30, Given the number of source vertices, the number of target vertices, and the parameters of a given distribution, the generator generates general graph based on the degree distribution generation model.

40, The social graph generation method based on the degree distribution generation model determines the number of source vertices and the number of target vertices of each community graph and graphs among community, the method generates simple graphs and combine them into a social graph.

50, The social graph generation method based on the degree distribution generation model generates graphs in a streaming manner by comparing the numbers of source vertices and target vertices in the current generation stage and those in the last generation stage to determine the new vertices and edges, it generates a simple graph in each generation stage.

The schema for the social graph generation is defined as follows.

The schema includes vertex schema, edge schema, community schema, and social graph generation schema, whose symbols are defined as follows.

The vertex schema VS=(lbl, amount, attr), where amount is the number of vertices labeled lbl, and attr is the attribute information. Attributes of a vertex are represented as a set of key-value pairs.

The edge schema ES=(lbl, $lbl_s$, $lbl_t$, amount, $distr_{in}$, $distr_{out}$, attr), where lbl and $lbl_t$ are respectively the label of source vertices and target vertices, amount is the number of edges labeled lbl, $distr_{in}$ stands for the in-degree distribution of target vertices, and $distr_{out}$ stands for the out-degree distribution of source vertices. Attributes information attr of edges are a set of key-value pairs.

The community schema CS=($lbl_e$, amount, $\lambda_s$, $\lambda_t$, $\rho$), where $lbl_e$ is the label of edges in a community, and amount is the number of communities. The community size conforms to a power-law distribution, $\lambda_s$ and $\lambda_t$ are the power-law parameters of the community size in source and target vertices, respectively. The number of edges between different communities depends on the community fusion parameter $\rho$ which is a real number between 0 and 1.

The social graph generation schema SGS=(VSS, ESS, CSS), where VSS, ESS, and CSS represent a set of vertex schemas, a set of edge schemas, and a set of community schemas, respectively.

The symbols of the generated social graph are as follows: The heterogeneous graph G=(V,E), where V is the vertex set, and E⊆V×V is the edge set.

A vertex v∈V is represented as a triple (id, lbl, attr), where id, lbl, and attr stand for ID, label, and attributes of the vertex, respectively.

An edge e∈E is represented as ($v_s$, $v_t$, lbl, attr), where $v_s$ is the source vertex ID, $v_t$ is the target vertex ID, lbl is the edge label, and attr is the attributes of the edge. The $v_s$, $v_t$, and lbl unique identify an edge e.

The social graph generation method generates an out-degree and multiple target vertices for a source vertex randomly and ensure that the in-degree distribution and out-degree distribution conform to desired distributions.

The probability mass function is derived as follows:

$$p(x) = \begin{cases} \alpha P(D=x;\theta) & \text{if } x \in [d_{min}, d_{max}] \text{ and } x \in N^+ \\ 0 & \text{otherwise} \end{cases};$$

where $d_{min}$ and $d_{max}$ are the minimum degree and maximum degree, respectively. $\theta$ indicates the parameters of the degree distribution. $P(D=x;\theta)$ is the existence probability of vertices with degree $D=x$. The normalization parameter a is used to make the sum of the probabilities of vertices whose degrees are in a certain range be 1.

The formula of computing $\alpha$ is as follows:

$$\alpha = \frac{1}{\sum_{k=d_{min}}^{d_{max}} P(D=x;\theta)}.$$

The formula of cumulative distribution function (CDF) is as follows: $F(x) = \sum_{i=d_{min}}^{x} \alpha P(D=i;\theta)$, where $x \in [d_{min}, d_{max}]$.

To generate a random value conforming to a desired cumulative distribution function $F(x)$, we first generate a uniformly distributed random value y on [0,1], and then $F^{-1}(y)$ is the random value which is derived from the CDF $F(x)$. To compute $F^{-1}(y)$ efficiently, a new function G is designed as follows:

$$G(z) = \arg\max_{x} F(x) \le z, x \in [d_{min}, d_{max}],$$

where $z \in \{i \cdot step | i \in N^+, step = \min P(D=x), i \cdot step \le 1\}$. Given a uniformly distributed random value y on [0,1], we can obtain $F^{-1}(y)$ from $$G\left(\left\lfloor \frac{y}{step} \right\rfloor \cdot step\right)$$

directly.

According to the degree distribution generation model, the procedure GenOutDegree($distr_{out}$, $n_s$, $n_e$) is implemented. The parameters of the procedure are: the out-degree distribution $distr_{out}$, the number of source vertices $n_s$ and the expected number of edges $n_e$. The output of the procedure is the out-degree of a source vertex.

Given the out-degree distribution $distr_{out}$, the number of source vertices $n_s$ and the expected number of edges $n_e$, the out-degree of a source vertex is calculated as follows.

The number of edges $n_e$' when the out-degree of source vertices follows the $distr_{out}$ distribution:

$$n_e' = \sum_{k=outd_{min}}^{outd_{max}} x \cdot n_s \cdot \alpha \cdot P(D=x;\theta_{out}),$$

where $outd_{min}$ is the minimum out-degree of source vertices, $outd_{max}$ is the maximum out-degree of source vertices, and $\theta_{out}$ is the parameter of $distr_{out}$.

If the number of the expected edges $n_e$=-1, there is no need to adjust parameters. Otherwise, the method should adjust the maximum out-degree $outd_{max}$ to make $n_e$'matches $n_e$. There are three cases as follows.

If $n_e' < n_e$, increase $outd_{max}$ until the number of vertices with out-degree $outd_{max}$ is less than 1, or $n_e' > n_e$.

If $n_e' = n_e$, there is no need to adjust $outd_{max}$.

If $n_e' > n_e$, reduce $outd_{max}$ to make $n_e' \le n_e$.

The formula of the cumulative distribution function (CDF) is: $F(x) = \sum_{i=outd_{min}}^{x} \alpha P(D=i;\theta_{out})$, where $x \in [outd_{min}, outd_{max}]$.

To generate a random number following a specified distribution whose CDF is $F(x)$, we first generate a uniformly distributed value on [0,1] denoted as y, and then $F^{-1}(y)$ is the generated number.

Design a new function $$G(z) = \arg\max_{x} F(x) \le z, x \in [\text{out } d_{min}, \text{out } d_{max}],$$

where $z \in \{i \cdot step | i \in N^+, step = \min P(D=x), i \cdot step \le 1\}$.

Given a uniformly distributed random value y on [0,1], we can obtain $F^{-1}(y)$ from $$G\left(\left\lfloor \frac{y}{step} \right\rfloor \cdot step\right)$$

directly.

The social graph generation method generates a target vertex for a source vertex with a determined out-degree.

Given the in-degree distribution $distr_{in}$, the number of target vertices $n_t$, and the expected number of edges $n_e$, compute a target vertex ID to make the in-degree distribution conforms to the expected distribution.

We give a constraint on the relationship between the in-degrees of vertices and their IDs. Given a series of target vertices $v_1, v_2, \ldots, v_{nt}$, the in-degrees of these vertices are nondecreasing. This constraint is reasonable because we can generate a permutation of $[1, n_t]$ as a mapping function to change the original IDs of target vertices so that there is no apparent relationship between the IDs and in-degrees of vertices.

Define an additional cumulative distribution function of the sum of in-degree: $F_s(x) = \sum_{i=ind_{min}}^{x} \beta \cdot \alpha \cdot P(D=i;\theta_{in})$, where $x \in [ind_{min}, ind_{max}]$ and $\beta$ is a normalization parameter and its formula is $$\beta = \frac{1}{\sum_{k=ind_{min}}^{ind_{max}} i \cdot \alpha \cdot P(D=x;\theta_{in})}.$$

Given a random number $y \in [0,1]$, the degree distribution generation model is used to find two CDF values satisfying $F_s(x_1) \le y \le F_s(x_2)$ and the corresponding target vertex IDs are determined as follows.

Given a uniformly distributed random value y on [0,1], we first find two cumulative distribution function values $F_s(x_1)$ and $F_s(x_2)$ satisfying $F_s(x_1) \le y \le F_s(x_2)$, $x_1 + 1 \ge x_2$ and the corresponding vertices IDs.

Define two auxiliary functions between some random values on [0,1] and the CDF values are as follows:

$$H_1(z) = F_s\left(\arg\max_x F_s(x) \le z\right), H_2(z) = F_s\left(\arg\min_x F_s(x) \ge z\right),$$

where x is the in-degree, $$z \in \{i \cdot \text{step} | i \in N^+\}, \text{step} = \min_{x \in [ind_{min}, ind_{max}]} (F_s(x+1) - F_s(x)), \quad i \cdot \text{step} \le 1.$$

To find the corresponding target vertex IDs, another two functions are defined as follows:

$$G_1(z) = \sum_{k=ind_{min}}^{x_1} i \cdot \alpha \cdot P(D = i; \theta_{in}),$$

$$G_2(z) = \sum_{k=ind_{min}}^{x_2} i \cdot \alpha \cdot P(D = i; \theta_{in}),$$

where, $$x_1 = \arg\max_x F_s(x) \le z,$$

$$x_2 = \arg\min_x F_s(x) \ge z.$$

The target vertex ID is calculated by $$G_1(z) + \left\lfloor (y - H_1(z)) \times \frac{G_2(z) - G_1(z)}{H_2(z) - H_1(z)} \right\rfloor.$$

Given the number of source vertices, the number of target vertices, and the degree distribution parameters, the social graph generation method based on the degree distribution generation model generates general graphs as follows.

The parameters for generation include the number of source vertices $n_s$, the number of target vertices $n_t$, the number of expected edges $n_e$, the in-degree distribution of target vertices $distr_{in}$, and the out-degree distribution of source vertices $distr_{out}$.

We can use an $n_s \times n_t$ matrix M to represent the graph. $M_{ij} = 1$ means that there exists an edge from a source vertex $v_i$ to a target vertex $v_j$, and $M_{ij} = 0$ implies that there is no such edge.

The general graph generation method determines outd target vertices to build edges.

The social graph generation method based on the degree distribution generation model determines the number of source vertices and the number of target vertices of each community graph and graphs among community. Then, the generator generates simple graphs and combine them into a social graph.

Given a social graph generation schema S, let $d_{out}(u)$ be the out-degree of vertex u, $d_{out}^i(u)$ the out-degree of u with vertices inside the same community, and $d_{out}(u) = d_{out}(u) - d_{out}^i(u)$ the out-degree of u with vertices in other communities. A probability dense function (PDF) for $d_{out}^e(u)$ of vertex u as follows.

$$p(x) = \begin{cases} \alpha e^{-\frac{x}{1+\rho}} & \text{if } x \in [1, \text{out } d'_{max}] \\ 0 \end{cases},$$

where $\alpha$ is a normalization parameter, p is the community fusion parameter user-defined in community schemas and is a real number between 0 and 1, and $\text{outd}_{max}' = \text{outd}_{max} - d_{out}^i(u)$, $\text{outd}_{max}$ is the maximum out-degree of source vertices, p(x) is a monotone decreasing function which means that the probability of having a small $d_{out}(u)$ for a source vertex u is higher, i.e., vertices between two communities connect sparsely. The larger p, the higher probability that a source vertex has a larger $d_{out}(u)$, i.e., there will be more edges in blocks which are not on the main diagonal.

Regard the out-degree random variable $d_{out}^e(u)$ as a continuous variable, and then the following equation according to the property of PDF:

$$\int_1^{out\, d'_{max}} \alpha e^{-\frac{x}{1+\rho}} = 1.$$

For a source vertex u, the out-degree with vertices in other communities $$d_{out}^e(u) = -(1+\rho)\log\left(e^{-\frac{1}{1+\rho}} + y\left(e^{-\frac{out\, d'_{max}}{1+\rho}} - e^{-\frac{1}{1+\rho}}\right)\right),$$

where y is a real number from a uniform distribution U(0,1) and the following equation holds between y and the target external out-degree $d_{out}^e(u)$:

$$\int_1^{d_{out}^e(u)} \alpha e^{-\frac{x}{1+\rho}} = y.$$

For each edge schema ES and the corresponding source vertex schema $VS_s$, target vertex schema $VS_t$, and the community schema CS, denote the number of generated edges ES·amount as $n_e$, the number of source vertices $VS_s$·amount as $n_s$, the number of target vertices $VS_t$·amount as $n_t$, the number of communities CS·amount as $n_c$, and CS·$\lambda_s$ and CS·$\lambda_t$ are the power-law parameters.

Determine the size of each community according to the number of communities CS·amount and the power-law parameters CS·$\lambda_s$ and CS·$\lambda_t$ so that the community size conforms to a power-law distribution. Denote the size of $n_c$ communities as:

$$n_{s_1} \times n_{t_1}, \ldots, n_{s_{n_c}} \times n_{t_{n_c}}.$$

For a source vertex u, generate an external out-degree $d_{out}^e(u)$ with vertices in other communities randomly, and then $d_{out}(u)$ target vertices are generated to build edges from the source vertex u to target vertices in other communities.

The social graph generation method based on the degree distribution generation model generates graphs in a streaming manner by comparing the numbers of source vertices and target vertices in the current generation stage and those in the last generation stage to determine the new vertices and edges. Then, it generates a simple graph in each generation stage.

Given the number of source vertices $n_s$, the number of target vertices $n_t$, the number of expected edges $n_e$, the in-degree distribution of target vertices $distr_{in}$, the out-degree of source vertices $distr_{out}$, and the growing rate $r_g$ which is a real number in the interval [0,1], the streaming graphs generation process is as follows.

The last percentage and the target percentage are initialized to be 0 and $r_g$, respectively.

The generation process can be decomposed into a series of sub-process of generating a general graph in a non-streaming manner. In each generation sub-process, the number of source vertices and that of target vertices are $n_s \cdot pc_{tg}$ and $n_t \cdot pc_{tg}$, respectively. For an existing source vertex, the out-degree is the difference between the result in this sub-process and that in the last sub-process. For a new source vertex, determine an out-degree directly. When generating a target vertex, the algorithm should make sure that the ID is equal to or less than $n_t \cdot pc_{tg}$.

With the rapid progress of social media, billions of nodes are becoming more and more common in real-world applications. A number of existing social network analysis tasks conduct on these large-scale networks to assist in practical applications. It usually takes significant resources to achieve the underlying large network. Thus, it is necessary to use synthetic graphs to verify the efficiency and scalability of social network analysis tasks.

This disclosure proposes a social graph generation method using a user-defined schema to satisfy various scenarios. We propose a degree distribution generation model to generate random values following a specified distribution efficiently. It is efficient to determine an out-degree and a number of target vertices for a source vertex to generate edges. The vertices in the synthesis graph could represent the users in the real-world network and the edges could represent the relationships in the network.

The generated graphs have the characteristics of real-world social networks, including small world, community structures, and power-law distribution. The synthesis social graphs could be used for social network analysis tasks, such as community detection, community search, and network representation learning.

For those skilled in the art, Obviously, the embodiments of the present disclosure are not limited to the details of the exemplary embodiments described above, Moreover, without departing from the spirit or essential characteristics of the embodiments of the present disclosure, Embodiments of the present disclosure can thus be implemented in other specific forms, No matter from which point, The examples are to be considered exemplary, And is not limiting, The scope of embodiments of the present disclosure is defined by the appended claims rather than by the foregoing description, It is therefore intended that all changes falling within the meaning and scope of the equivalents of the claims be embraced within the embodiments of the present disclosure and that any reference numerals in the claims not be construed as limiting the claims concerned; in addition, Obviously, the word "comprising" does not exclude other elements or steps, the singular does not exclude multiple elements, modules, or devices recited in the plural system, device, or terminal claims, and the terms first, second, or the like may also be implemented by the same element, module, or device in software or hardware to denote names, rather than any particular order.

Finally, it should be noted that, the above embodiments are merely illustrative of the technical solution of the embodiments of the present disclosure and are not intended to be limiting, While the embodiments of the present disclosure have been described in detail with reference to the preferred embodiments described above, it will be appreciated by those skilled in the art that modifications or equivalent substitutions to the embodiments of the present disclosure should not depart from the spirit and scope of the embodiments of the present disclosure.

What is claimed is:

1. A social graph generation method using a degree distribution generation model, comprising: set the schema which is used to generate social graphs, the generator generates social graphs according to a user-defined schema information;

degree distribution generation model, The generator generates the out-degree for a source vertex and a number of target vertices using the degree distribution generation model to make sure the out-degree of source vertices and in-degree of target vertices conform to the desired distribution;

given the number of source vertices and target vertices and the parameters of the degree distributions, the generator generates general graphs;

the generator generates social graphs based on the degree distribution generations model, Determine the size of each community, Determine the number of source vertices and target vertices of each community graph and graph among communities, which are generated using the general graph generation algorithm and be combined into a social graph;

the generator generates graphs in a streaming manner by comparing the numbers of source vertices and target vertices in the current generation stage and those in the last generation stage to determine the new vertices and edges, then, it generates a simple graph in each generation stage;

wherein the social graph generation method generates an out-degree and multiple target vertices for a source vertex randomly and ensure that the in-degree distribution and out-degree distribution conform to desired distributions:

the probability mass function is derived as follows:

$$p(x) = \begin{cases} \alpha P(D = x; \theta) & \text{if } x \in [d_{min}, d_{max}] \text{ and } x \in N^+ \\ 0 & \text{otherwise} \end{cases} ;$$

where $d_{min}$ and $d_{max}$ are the minimum degree and maximum degree, respectively, $\theta$ indicates the parameters of the degree distribution, $P(D=x;\theta)$ is the existence probability of vertices with degree $D=x$, the normalization parameter a is used to make the sum of the probabilities of vertices whose degrees are in a certain range be 1;

given the out-degree distribution $distr_{out}$, the number of source vertices $n_s$ and the expected number of edges $n_e$, the out-degree of a source vertex is calculated as follows;

the number of edges $n_e'$ when the out-degree of source vertices follows the $distr_{out}$ distribution:

$n_e' = \Sigma_{x=outd_{min}}^{outd_{max}} x \cdot n_s \cdot \alpha \cdot P(D=x; \theta_{out})$, Where $outd_{min}$ is the minimum out-degree of source vertices, $outd_{max}$ is the maximum out-degree of source vertices, and $\theta_{out}$ is the parameter of $distr_{out}$, adjust the maximum out-degree $outd_{max}$ to make the number of existing edges $n_e'$ match the number of expected edges $n_e$;

the formula of the cumulative distribution function (CDF) is: $F(x) = \Sigma_{i=outd_{min}}^{x} \alpha P(D=i; \theta_{out})$, where $x \in [outd_{min}, outd_{max}]$;

to generate a random number following a specified distribution whose CDF is $F(x)$, we first generate a uniformly distributed value on [0,1] denoted as y, and then $F^{-1}(y)$ is the generated number;

design a new function $$G(z) = \underset{x}{\arg\max} \ F(x) \le z, \ x \in [outd_{min}, outd_{max}],$$

where $z \in \{j \cdot \text{step} | i \in N^+, \text{step}=\min P(D=x), i \cdot \text{step}<1\}$;

given a uniformly distributed random value y on [0,1], we can obtain $F^{-1}(y)$ from $G(\lfloor y/\text{step} \rfloor \cdot \text{step})$ directly.

2. The method of claim 1, wherein the schema for the social graph generation is defined as follows: the schema includes vertex schema, edge schema, community schema, and social graph generation schema, whose symbols are defined as follows:

the vertex schema VS=(lbl, amount, attr), where amount is the number of vertices labeled lbl, and attr is the attribute information, Attributes of a vertex are represented as a set of key-value pairs;

the edge schema ES=(lbl, $\text{lbl}_s$, $\text{lbl}_t$, amount, $\text{distr}_{in}$, $\text{distr}_{out}$, attr), where $\text{lbl}_s$ and $\text{lbl}_t$ are respectively the label of source vertices and target vertices, amount is the number of edges labeled lbl, $\text{distr}_{in}$ stands for the in-degree distribution of target vertices, and $\text{distr}_{out}$ stands for the out-degree distribution of source vertices, Attributes information attr of edges are a set of key-value pairs;

the community schema CS=($\text{lbl}_e$, amount, $\lambda_s$, $\lambda_t$, $\rho$), where $\text{lbl}_e$ is the label of edges in a community, and amount is the number of communities, The community size conforms to a power-law distribution, $\lambda_s$ and $\lambda_t$ are the power-law parameters of the community size in source and target vertices, respectively, The number of edges between different communities depends on the community fusion parameter $\rho$ which is a real number between 0 and 1;

the social graph generation schema SGS=(VSS, ESS, CSS), where VSS, ESS, and CSS represent a set of vertex schemas, a set of edge schemas, and a set of community schemas, respectively;

the symbols of the generated social graph are as follows:

the heterogeneous graph G=(V,E), where V is the vertex set, and $E \subseteq V \times V$ is the edge set;

a vertex $v \in V$ is represented as a triple (id, lbl, attr), where id, lbl, and attr stand for ID, label, and attributes of the vertex, respectively;

an edge $e \in E$ is represented as ($v_s$, $v_t$, lbl, attr), where $v_s$ is the source vertex ID, $v_t$ is the target vertex ID, lbl is the edge label, and attr is the attributes of the edge, The $v_s$, $v_t$, and lbl unique identify an edge.

3. The method of claim 2, wherein, the community fusion parameter $\rho$ is a real number between 0 and 1, Larger $\rho$ values mean that there will be more edges among communities.

4. The method of claim 1, wherein the method of adjusting the maximum out-degree $\text{outd}_{max}$ to make the number of existing edges $n_e'$ match the number of expected edges $n_e$ is as follows:

if $n_e' < n_e$, increase $\text{outd}_{max}$ until the number of vertices with out-degree $\text{outd}_{max}$ is less than 1, or $n_e' \geq n_e$;

if $n_e' = n_e$, there is no need to adjust $\text{outd}_{max}$;

if $n_e' > n_e$, reduce $\text{outd}_{max}$ to make $n_e' \leq n_e$.

5. The method of claim 1, wherein the generator generates a target vertex for a source vertex with a determined out-degree:

given the in-degree distribution $\text{distr}_{in}$, the number of target vertices $n_t$, and the expected number of edges $n_e$, compute the a target vertex ID to make the in-degree distribution conforms to the expected distribution;

define an additional cumulative distribution function of the sum of in-degree: $F_s(x) = \sum_{i=ind_{min}}^{x} \beta \cdot i \cdot \alpha \cdot P(D=i; \theta_{in})$, where $x \in [ind_{min}, ind_{max}]$ and $\beta$ is a normalization parameter and its formula is $$\beta = \frac{1}{\sum_{k=ind_{min}}^{ind_{max}} i \cdot \alpha \cdot P(D=i; \theta_{in})};$$

define two auxiliary functions between some random values on [0,1] and the CDF values are as follows:

$$H_1(z) = F_s\left(\operatorname*{argmax}_x F_s(x) \leq z\right), H_2(z) = F_s\left(\operatorname*{argmin}_x F_s(x) \geq z\right),$$

where x is the in-degree, $$z \in \{i \cdot \text{step} \mid i \in N^+\},$$

$$\text{step} = \min_{x \in [ind_{min}, ind_{max}]} (F_s(x+1) - F_s(x)), i \cdot \text{step} \leq 1;$$

to find the corresponding target vertex IDs, another two functions are defined as follows:

$$G_1(z) = \sum_{k=ind_{min}}^{x_1} i \cdot \alpha \cdot P(D=i; \theta_{in}),$$

$$G_2(z) = \sum_{k=ind_{min}}^{x_2} i \cdot \alpha \cdot P(D=i; \theta_{in}),$$

where, $x_1 = \operatorname*{argmax}_x F_s(x) \leq z$, $x_2 = \operatorname*{argmin}_x F_s(x) \geq z$;

the target vertex ID is calculated by $$G_1(z) + \left\lfloor (y - H_1(z)) \times \frac{G_2(z) - G_1(z)}{H_2(z) - H_1(z)} \right\rfloor.$$

6. The method of claim 5, wherein given the number of source vertices, the number of target vertices, and the degree distribution parameters, the generation process of general graphs is as follows:

the parameters for generation include the number of source vertices $n_s$, the number of target vertices $n_t$, the number of expected edges $n_e$, the in-degree distribution of target vertices $\text{distr}_{in}$, and the out-degree distribution of source vertices $\text{distr}_{out}$;

We can use an $n_s \times n_t$ matrix M to represent the graph, $M_{ij}=1$ means that there exists an edge from a source vertex $v_i$ to a target vertex $v_j$, and $M_{ij}=0$ implies that there is no such edge;

the general graph generation method determines outd target vertices to build edges.

7. The method of claim 6, wherein determine the number of source vertices and the number of target vertices of each community graph and graphs among community, then, the generator generates simple graphs and combine them into a social graph;

given a social graph generation schema S, let $d_{out}(u)$ be the out-degree of vertex u, $d_{out}^i(u)$ the out-degree of u with vertices inside the same community, and $d_{out}^e(u) = d_{out}(u) - d_{out}^i(u)$ the out-degree of u with vertices in other communities, A probability dense function (PDF) for $d_{out}^e(u)$ of vertex u as follows:

$$p(x) = \begin{cases} \alpha e^{-\frac{x}{1+\rho}} & \text{if } x \in [1, outd'_{max}], \\ 0 & \end{cases}$$

where $\alpha$ is a normalization parameter, $\rho$ is the community fusion parameter user-defined in community schemas and is a real number between 0 and 1, and $outd_{max}' = outd_{max} - d_{out}^i(u)$, $outd_{max}$ is the maximum out-degree of source vertices, $p(x)$ is a monotone decreasing function;

regard the out-degree random variable $d_{out}^e(u)$ as a continuous variable, and then the following equation according to the property of PDF:

$$\int_1^{outd'_{max}} \alpha e^{-\frac{x}{1+\rho}} = 1;$$

for a source vertex u, the out-degree with vertices in other communities $$d_{out}^e(u) = -(1+\rho)\log\left(e^{-\frac{1}{1+\rho}} + y\left(e^{-\frac{outd'_{max}}{1+\rho}} - e^{-\frac{1}{1+\rho}}\right)\right),$$

where y is a real number from a uniform distribution $U(0,1)$ and the following equation holds between y and the target external out-degree $d_{out}^e(u)$:

$$\int_1^{d_{out}^e(u)} \alpha e^{-\frac{x}{1+\rho}} = y;$$

for each edge schema ES and the corresponding source vertex schema $VS_s$, target vertex schema $VS_t$, and the community schema CS, denote the number of generated edges ES·amount as $n_e$, the number of source vertices $VS_s$·amount as $n_s$, the number of target vertices $VS_t$·amount as $n_t$, the number of communities CS·amount as $n_c$, and CS·$\lambda_s$ and CS·$\lambda_t$ are the power-law parameters;

determine the size of each community according to the number of communities CS·amount and the power-law parameters CS·$\lambda_s$ and CS·$\lambda_t$ so that the community size conforms to a power-law distribution, Denote the size of $n_c$ communities as: $n_{s_1} \times$ $$n_{s_1} \times n_{t_1}, \ldots, n_{s_{n_c}} \times n_{t_{n_c}};$$

for a source vertex u, generate an external out-degree $d_{out}^e(u)$ with vertices in other communities randomly, and then $d_{out}^e(u)$ target vertices are generated to build edges from the source vertex u to target vertices in other communities.

8. The method of claim 7, wherein the generator generates graphs in a streaming manner by comparing the numbers of source vertices and target vertices in the current generation stage and those in the last generation stage to determine the new vertices and edges, then, it generates a simple graph in each generation stage:

given the number of source vertices $n_s$, the number of target vertices $n_t$, the number of expected edges $n_e$, the in-degree distribution of target vertices $distr_{in}$, the out-degree of source vertices $distr_{out}$, and the growing rate $r_g$ which is a real number in the interval [0,1], the streaming graphs generation process is as follows:

the last percentage and the target percentage are initialized to be 0 and $r_g$, respectively;

the generation process can be decomposed into a series of sub-process of generating a general graph in a non-streaming manner, In each generation sub-process, the number of source vertices and that of target vertices are $n_s \cdot pc_{tg}$ and $n_t \cdot pc_{tg}$, respectively, for an existing source vertex, the out-degree is the difference between the result in this sub-process and that in the last sub-process, for a new source vertex, determine an out-degree directly; when generating a target vertex, the algorithm should make sure that the ID is equal to or less than $n_t \cdot pc_{tg}$.

\* \* \* \* \*